Patented Dec. 14, 1948

2,456,568

UNITED STATES PATENT OFFICE 2,456,568

TEXTILE TREATING RESINS

Milton J. Scott and Stuart H. Rider, Springfield, Mass., assignors to Monsanto Chemical Company, St. Louis, Mo., a corporation of Delaware No Drawing. Application November 8, 1946, Serial No. 708,806

8 Claims. (Cl. 260—67.6)

This invention relates to melamine ethers. More particularly the invention relates to a process for modifying melamine ethers with thiourea.

Melamine-thiourea-aldehyde resins are known to be excellent impregnants for various textiles. However, they are not generally used commercially as textile treating agents because of their relative instability.

An object of this invention is to provide stable thiourea modified ethers of methylol melamine.

A further object is to provide a process for producing thiourea modified ethers of methylol melamines.

These and other objects are attained by making a melamine ether under acid conditions, making the reaction mixture alkaline and then reacting the melamine ether with thiourea.

The following examples are given by way of illustration and are not intended as a limitation of the scope of this invention. Where parts are mentioned they are parts by weight.

Example I

Hexamethylol melamine was prepared by refluxing for 1 hour at atmospheric pressure, a mixture containing 1 mol of melamine, 6 mols of formaldehyde and 15 mols of methanol. The formaldehyde used was in the commercial aqueous form known as Formalin which contains 37% formaldehyde. At the end of the refluxing period 16 mols of methanol were added and the mixture was cooled to about 30° C. 1.3 mols of concentrated hydrochloric acid were then added to the mixture and the temperature was maintained at 25-30° C. for about 1 hour to produce a methanol-water solution of an essentially monomeric methyl ether of hexamethylol melamine.

To the ether solution were added 1.3 mols of flake sodium hydroxide to neutralize the acid etherification catalyst (HCl) and the pH of the solution was adjusted to about 8-9 with aqueous sodium hydroxide (40% NaOH). Next, 2.5 mols of thiourea and 5 mols of formaldehyde (again using Formalin) were added to the solution and the pH readjusted to about 8-9 with aqueous sodium hydroxide. The resultant alkaline reaction mixture was kept at about 30° C. for about 1 hour and was constantly agitated during the reaction period. The resulting product was a water-white, methanol-water solution of a methyl ether of hexamethylol melamine modified with thiourea and formaldehyde. The solution, and resin in the solution, were stable in storage for relatively long periods.

The solution of thiourea modified methylol melamine in methanol and water was applied to cotton, wool, and rayon fabrics by roll-coating. A resin pickup of from 5-20% by weight of resin based on the weight of the fabric was obtained by varying the roll-coating procedure. The coated fabrics were dried by gentle heating at about 100° C. and the resin was cured to the insoluble infusible state by further heating at about 100 to about 200° C. without the use of a curing catalyst. The treated fabrics were creaseproof and shrinkproof and had the extremely valuable property of having high resistance to chlorine pickup in subsequent bleaching operations. The treated textiles did not become yellow on ageing or laundering even though sodium hypochlorite was used as a bleach in the laundering process. Furthermore, the "hand" of the cotton and wool fabrics was unaltered by impregnation with the resin and in the case of acetate rayon the "hand" was found to be softer after impregnation with the resin.

The process shown in Example I is a radical departure from the normal procedure in making thiourea modified methylol melamine ether resins. In the first place, the conditions during the process of making the methyl ether of hexamethylol melamine are carefully regulated to provide an essentially monomeric ether. Secondly, the etherification catalyst is neutralized and the solution made alkaline and maintained on the alkaline side during the reaction with thiourea and formaldehyde. This second phase is particularly important in preparing a stable material. The combination of using an essentially monomeric melamine ether and reacting it with thiourea under alkaline conditions yields a resin having valuable properties for the treatment of textiles.

In place of the methyl ether of hexamethylol melamine shown in the example, other water-soluble ethers of methylol melamine may be used including the methyl, ethyl, ethylene glycol monomethyl ether, ethylene glycol monoethyl ether, diethylene glycol ethyl ether and aminobutanol ethers of methylol melamines ranging from the mono- to the hexa-methylol melamines and mixtures thereof.

The ratio of thiourea to melamine on a molar basis may be varied from 90:10 to 10:90 according to the properties desired in the finished product. For optimum suppression of chlorine pickup, the ratio of thiourea to melamine may be varied from 85:15 to 40:60. For ease of processing and for economic considerations, it is preferred to restrict the thiourea-melamine ratio to from about 70:30 to about 60:40. The particular advantage of the resins of this invention is the reduction of chlorine pickup, of fabric treated therewith. The reduction in chlorine pickup increases rapidly up to a thiourea-melamine ratio of about 70:30. A ratio of thiourea to melamine as high as 90:10 may be used, if desired, to alter other properties of the resin but will have little additional effect on the chlorine suppression property.

The amount of formaldehyde used to react with the thiourea in the second step of the process may be any amount up to about 2 mols per mol of thiourea. It is not absolutely necessary to use formaldehyde since the thiourea will react with melamine ethers without added formaldehyde. On the other hand, more than 2 mols of formaldehyde per mol of thiourea may be used although the added benefits derived are of relatively minor importance and increase the cost of making the resin. A resin having particularly desirable properties comprises the reaction product of 1 mol of hexamethylol melamine etherified with methanol, 1 mol of thiourea and 2 mols of formaldehyde.

In making the melamine ethers of this invention, it has been found advantageous to use relatively large amounts of strong acids as etherification catalysts since by using relatively large amounts (at least ¼ mol of catalyst per mol of methylol melamine) the etherification reaction may be carried out at low temperatures, a procedure which insures the production of essentially monomeric ethers. The low molecular weight of the ethers is maintained during the reaction with thiourea and is responsible for the absence of harshening of the "hand" of textiles treated therewith.

It has been further found that the stability of thiourea modified hexamethylol melamine ethers may be increased by making the ethers and modifying them with thiourea under substantially anhydrous conditions. To achieve such conditions, anhydrous methanol and paraformaldehyde are employed.

*Example II*

245 parts (0.8 mol) of spray dried crystalline hexamethylol melamine were mixed with 516 parts of anhydrous methanol and 52 parts of 37% hydrochloric acid. The mixture was maintained at a temperature of about 25–30° C. for 1 hour to complete the etherification of the hexamethylol melamine. The mixture was then neutralized with 23 parts of flake sodium hydroxide and its pH was adjusted to about 8–9 with 40% aqueous solution of sodium hydroxide. To this mixture were added 152 parts (2 mols) of thiourea and 120 parts (4 mols) of paraformaldehyde. It was then heated at 70° C. for about 15 minutes then cooled and filtered to obtain a methanol solution of the methyl ether of hexamethylol melamine modified with a thiourea-formaldehyde condensation product. The resin, after removal of methanol by vacuum distillation, was a clear, water-soluble low molecular weight liquid resin. It was stable in storage and during treating operations on textiles. When applied to textiles from water solution or alcohol-water solution and cured thereon by heating at elevated temperatures (100–200° C.) it imparted to the fibers a high resistance to chlorine pickup and made them creaseproof and shrinkproof. The textiles did not yellow on ageing or laundering even though sodium hypochlorite was used as a bleaching agent. Furthermore, the "hand" of the fabrics was not altered by the sizing operation.

This combination of adding the thiourea to the reaction only under alkaline conditions and maintaining the amount of water present at a minimum allows the production of a surprisingly stable resin having extremely valuable textile treating properties.

As disclosed in the examples, the etherification reaction should be carried out at temperatures below 40° C. preferably in the range of 25–30° C. The temperature may be lowered even further if desired down to at least 20° C. The temperature of the thiourea modification reaction is preferably kept at 25–40° C. but temperatures up to refluxing temperature at atmospheric pressure may be used without substantially altering the properties of the final product.

The resins made by the process of this invention are stable in storage and when applied to textile fibers and fabrics, they markedly decrease the chlorine pickup of textiles treated therewith, impart creaseproofing and shrinkproofing qualities to the textiles, and do not yellow on ageing.

It is obvious that many variations may be made in the process and products of this invention without departing from the spirit and scope thereof as defined in the appended claims.

What is claimed is:

1. A process for preparing stable resins for treating textile fibers and fabrics which comprises reacting a water-soluble, substantially monomeric, monohydric alcohol ether of a methylol melamine with thiourea and formaldehyde at a pH of 8–9, the molar ratio of thiourea to chemically combined melamine varying between 90:10 and 10:90.

2. A stable textile treating resin made by the process of claim 1.

3. A process as in claim 1 wherein the monohydric alcohol ether is the methyl ether.

4. A stable textile treating resin made by the process of claim 3.

5. A process for preparing stable resins for treating textile fibers and fabrics which comprises reacting a water-soluble, substantially monomeric, monohydric alcohol ether of a methylol melamine with thiourea and formaldehyde at a pH of 8–9, the molar ratio of thiourea to chemically combined melamine varying between 85:15 and 40:60.

6. A stable textile treating resin made by the process of claim 5.

7. A process for preparing stable resins for treating textile fibers and fabrics which comprises reacting a water-soluble, substantially monomeric, monohydric alcohol ether of a methylol melamine with thiourea and formaldehyde at a pH of 8–9, the molar ratio of thiourea to chemically combined melamine varying between 70:30 and 60:40.

8. A stable textile treating resin made by the process of claim 7.

MILTON J. SCOTT.
STUART H. RIDER.

No references cited.